(12) United States Patent
Lin

(10) Patent No.: US 11,073,636 B2
(45) Date of Patent: Jul. 27, 2021

(54) OPTICAL DETECTION ASSEMBLY

(71) Applicant: Silergy Semiconductor Technology (Hangzhou) LTD, Hangzhou (CN)

(72) Inventor: Suyi Lin, New Taipei (TW)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 34 days.

(21) Appl. No.: 16/190,311

(22) Filed: Nov. 14, 2018

(65) Prior Publication Data
US 2019/0154870 A1 May 23, 2019

(30) Foreign Application Priority Data
Nov. 23, 2017 (CN) .......................... 201711184423.3

(51) Int. Cl.
*G01V 8/12* (2006.01)
(52) U.S. Cl.
CPC ...................................... *G01V 8/12* (2013.01)
(58) Field of Classification Search
CPC ....... G01V 8/12; G01S 7/4808; G01S 7/4813; G01S 17/08; G01J 1/4204
See application file for complete search history.

(56) References Cited

U.S. PATENT DOCUMENTS

| | | | |
|---|---|---|---|
| 9,361,609 B2 | 6/2016 | Franklin et al. | |
| 9,805,630 B2 | 10/2017 | Franklin et al. | |
| 2002/0008876 A1* | 1/2002 | Terui | G01S 7/4817 356/445 |
| 2009/0242370 A1 | 10/2009 | Chiang | |
| 2012/0294579 A1 | 11/2012 | Chen | |
| 2013/0153755 A1* | 6/2013 | Pikkujamsa | G01V 8/12 250/221 |
| 2014/0055408 A1 | 2/2014 | Liu et al. | |
| 2014/0131560 A1* | 5/2014 | Chen | G01S 7/4811 250/221 |
| 2015/0001414 A1* | 1/2015 | Morita | H05K 1/0284 250/393 |
| 2019/0154801 A1* | 5/2019 | Gani | G01S 7/497 |

\* cited by examiner

*Primary Examiner* — Que Tan Le
*Assistant Examiner* — Don J Williams
(74) *Attorney, Agent, or Firm* — Michael C. Stephens, Jr.

(57) ABSTRACT

An optical detection assembly can include: a light-emitting device and a photoelectric conversion device installed in parallel on a substrate, where light generated by the light-emitting device is irradiated onto an object, and the photoelectric conversion device is configured to convert a reflected light of the object into an electrical signal; and a housing formed by light shielding material installed on the substrate, where the housing includes a first chamber for accommodating the light-emitting device, a sidewall that separates the light-emitting device and the photoelectric conversion device, and at least one emitting light opening at the top of the first chamber and having an axis inclined at a tilt angle.

15 Claims, 16 Drawing Sheets

OPTICAL DETECTION ASSEMBLY

RELATED APPLICATIONS

This application claims the benefit of Chinese Patent Application No. 201711184423.3, filed on Nov. 23, 2017, which is incorporated herein by reference in its entirety.

FIELD OF THE INVENTION

The present invention generally relates to semiconductor technology, and more particularly to an optical detection assemblies.

BACKGROUND

Proximity detection is a technology for detecting objects approaching in non-contact conditions, and has a wide range of applications in industrial automation, Internet of Things (JOT) technology, and video games. Different types of sensors can be used for proximity detection technology, such as capacitive sensors, inductive sensors, and photoelectric sensors. In a photoelectric sensor, the light emitted by a light source is irradiated onto an object and the light energy is received by the photoelectric sensing device after being reflected by the object and converted into an electrical signal. The detection distance of the photoelectric sensor can be suitable for various daily applications, such as in a mobile phone for detecting a user's call posture, and in a virtual reality (VR) and a smart watch for detecting a user wearing a device.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1A:
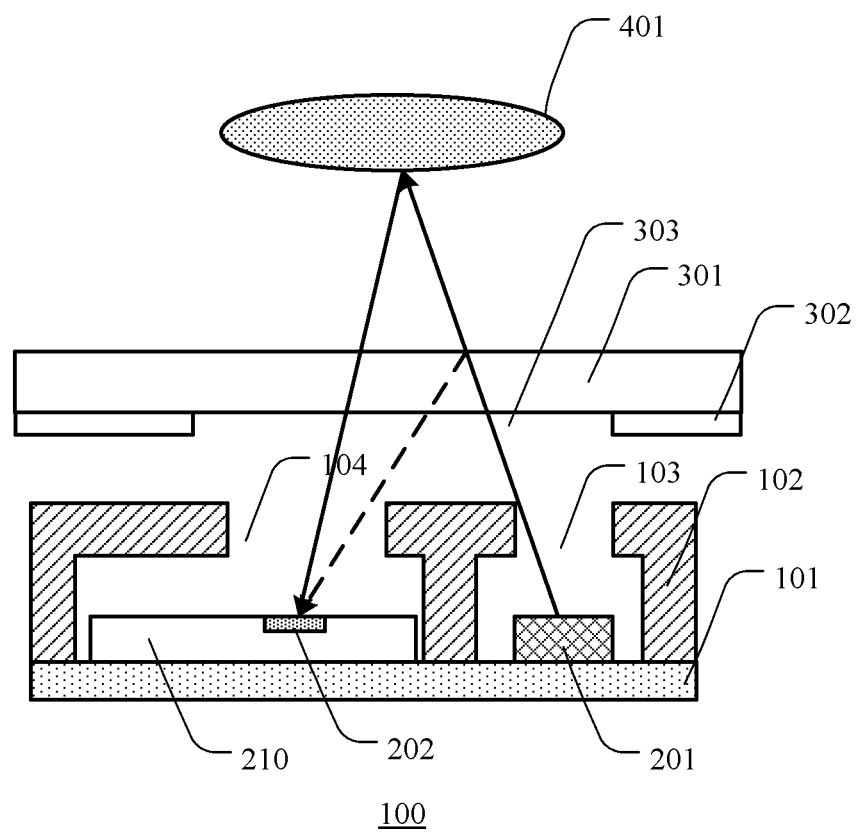
FIG. 1A is a cross-sectional diagram of an example optical detection assembly.
Figure 1B:
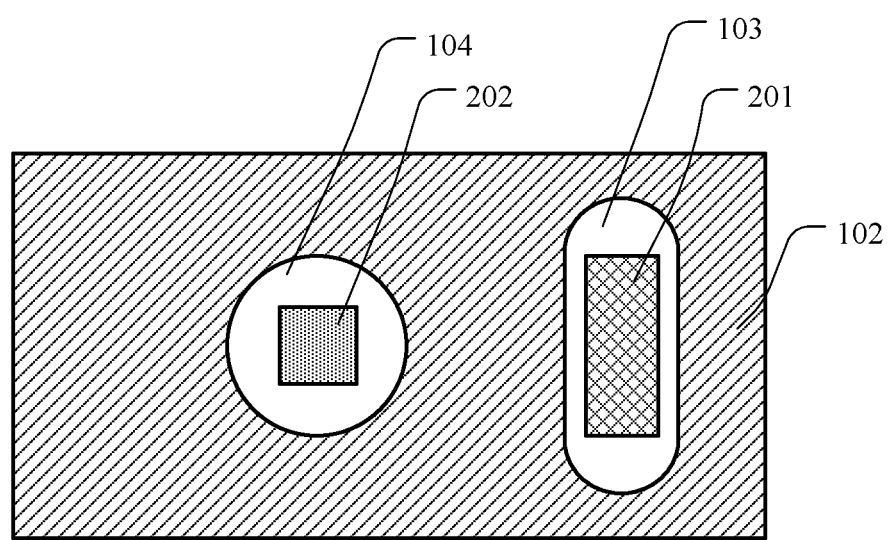
FIG. 1B is a top view diagram of the example optical detection assembly of FIG. 1A.

Referring now to FIG. 1A, shown is a cross-sectional diagram of an example optical detection assembly. Referring also to FIG. 1B, shown is a top view diagram of the example optical detection assembly of FIG. 1A, but without a covering plate for clarity. Optical detection assembly 100 can include substrate 101, housing 102 installed on substrate 101, light-emitting device 201, receiving circuit 210, transparent covering layer 301, and shielding layer 302 over substrate 101. Housing 102 may form an interior chamber accommodating light-emitting device 201 and receiving circuit 210, respectively. Emitting light opening 103 and receiving light opening 104 may be formed at the top of the interior chamber. Covering layer 301 and shielding layer 302 may together form a covering plate and define opening 303. A light generated by light-emitting device 201 as a light source can be sequentially irradiated onto object 401 through emitting light openings 103 and opening 303. Receiving circuit 210 can include photoelectric conversion device 202 that sequentially receives reflected light from the object through opening 303 and receiving light opening 104 such that photoelectric conversion device 202 may generate an electrical signal.

Light-emitting device 201 and photoelectric conversion device 202 can be integrated in the same package assembly according to optical detection assembly 100. Housing 102 may serve as a baffle that separates the light-emitting path and the light-reflecting path from each other, such that the component volume can be reduced. When optical detection assembly 100 is applied to an electronic device, such as a mobile phone, the size of the electronic device may further be reduced. However, the surface of transparent covering layer 301 can cause reflection of light between different refractive index media, as indicated by dashed lines. Reflected light from the surface of transparent covering layer 301 can also reach photoelectric conversion device 202 through receiving light opening 104, thereby producing optical crosstalk that can result in misjudgment of the distance of object 401. In a further improved optical detection assembly, a collimated light source or a concentrating lens may be employed to increase the directivity of the emitted light, in order to reduce optical crosstalk, but this increases the component cost and volume.

In one embodiment, an optical detection assembly can include: (i) a light-emitting device and a photoelectric conversion device installed in parallel on a substrate, where light generated by the light-emitting device is irradiated onto an object, and the photoelectric conversion device is configured to convert a reflected light of the object into an electrical signal; and (ii) a housing formed by light shielding material installed on the substrate, where the housing includes a first chamber for accommodating the light-emitting device, a sidewall that separates the light-emitting device and the photoelectric conversion device, and at least one emitting light opening at the top of the first chamber and having an axis inclined at a tilt angle.

Figure 2A:
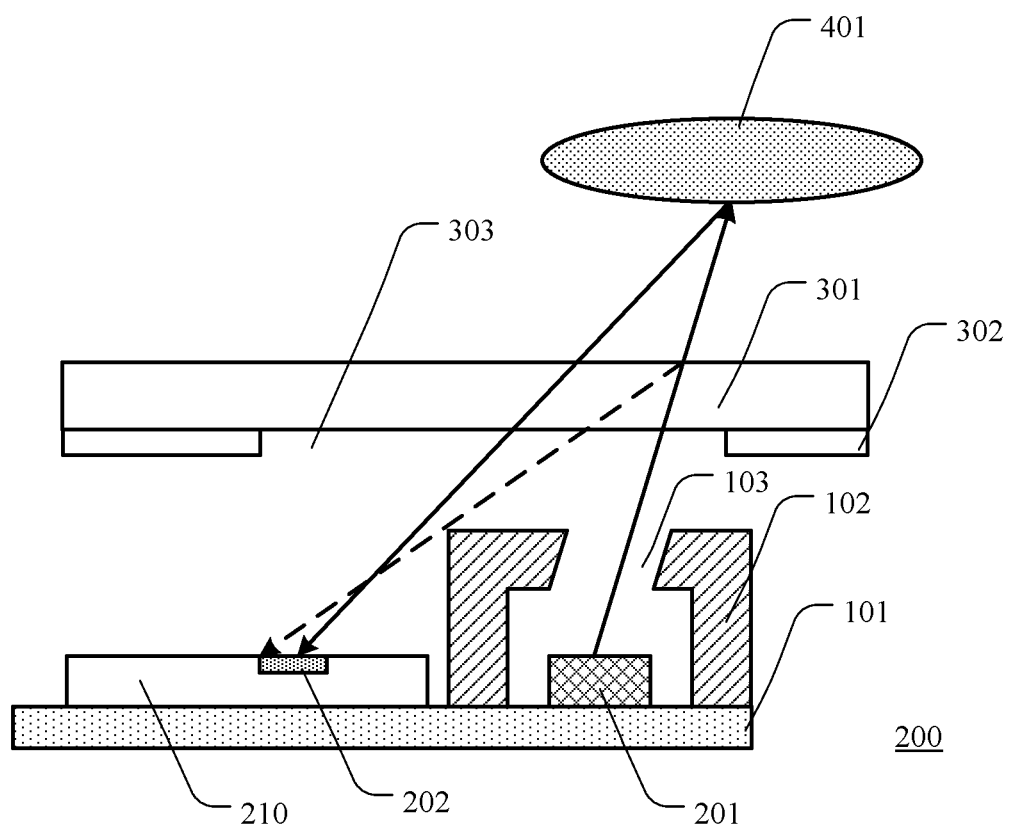
FIG. 2A is a cross-sectional view diagram of a first example optical detection assembly, in accordance with embodiments of the present invention.
Figure 2B:
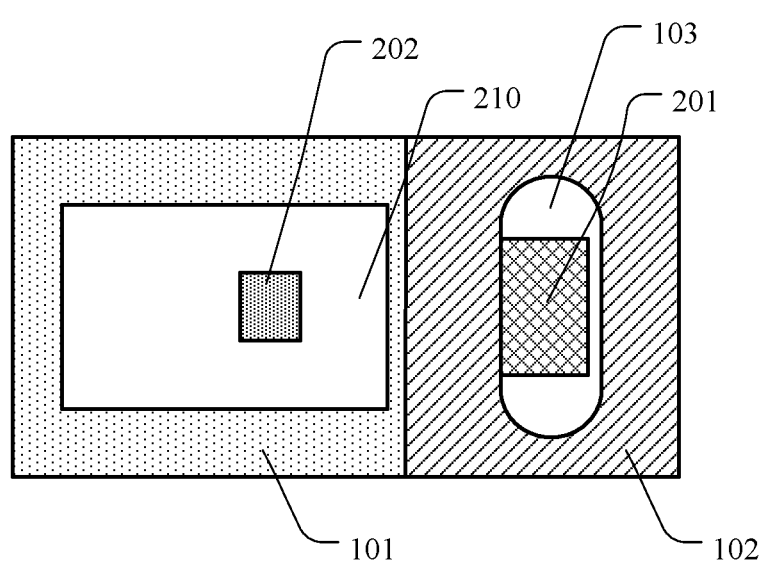
FIG. 2B is a top view diagram of the first example optical detection assembly, in accordance with embodiments of the present invention.

Referring now to FIG. 2A, shown is a cross-sectional view diagram of a first example optical detection assembly, in accordance with embodiments of the present invention. Referring also to FIG. 2B, shown is a top view diagram of the first example optical detection assembly, in accordance with embodiments of the present invention. For the sake of clarity, the covering plate is removed in the top view as shown. In this particular example, the optical detection assembly can include a light-emitting device for emitting light as a light source and a photoelectric conversion device for detecting reflected light of an object. Also, the light-emitting device and the photoelectric conversion device may be integrated in the same package assembly. In this example, optical detection assembly 200 can include substrate 101, housing 102 installed on substrate 101, light-emitting device 201, receiving circuit 210, transparent covering layer 301 over substrate 101, and shielding layer 302 over substrate 101.

For example, substrate 101 can be a printed-circuit board (PCB) for supporting housing 102, light-emitting device 201 and receiving circuit 210, and for providing wiring for circuit interconnection and external electrical connection. For example, light-emitting device 201 can include a light-emitting diode (LED), a laser diode (LD), and/or a vertical cavity surface emitting laser (VCSEL). Receiving circuit 210 can include photoelectric conversion device 202 and a signal processing circuit coupled thereto. For example, photoelectric conversion device 202 can be a photodiode and/or a phototransistor. Light-emitting device 201 and receiving circuit 210 may be separate chips installed on substrate 101 with an adhesive, and can be connected to the wiring on substrate 101 by a bonding wire. Housing 102 may be formed of a metal or an insulating material, and can be fixed on substrate 101 with an adhesive or a fastener. The interior of housing 102 may form a chamber accommodating light-emitting device 201.

A racetrack-shaped emitting light opening 103 may be formed at the top of the chamber. A covering plate can include covering layer 301 and barrier layer 302, and opening 303 can be defined by barrier layer 302. Covering layer 301 can be composed of glass, and barrier layer 302 can be a light-shielding coating formed on covering layer 301. For example, a gap between the covering plate and the top surface of housing 102 may be less than 1 mm. For example, a distance between light-emitting device 201 and photoelectric conversion device 202 can be in a range of 0.1 mm to 10 mm, e.g., 1 mm. The light generated by light-emitting device 201 as a light source may be irradiated onto object 401 through emitting light opening 103 and opening 303. Receiving circuit 210 may include photoelectric conversion device 202 that can receive reflected light from an object through opening 303, and convert the reflected light into an electrical signal.

Figure 3:
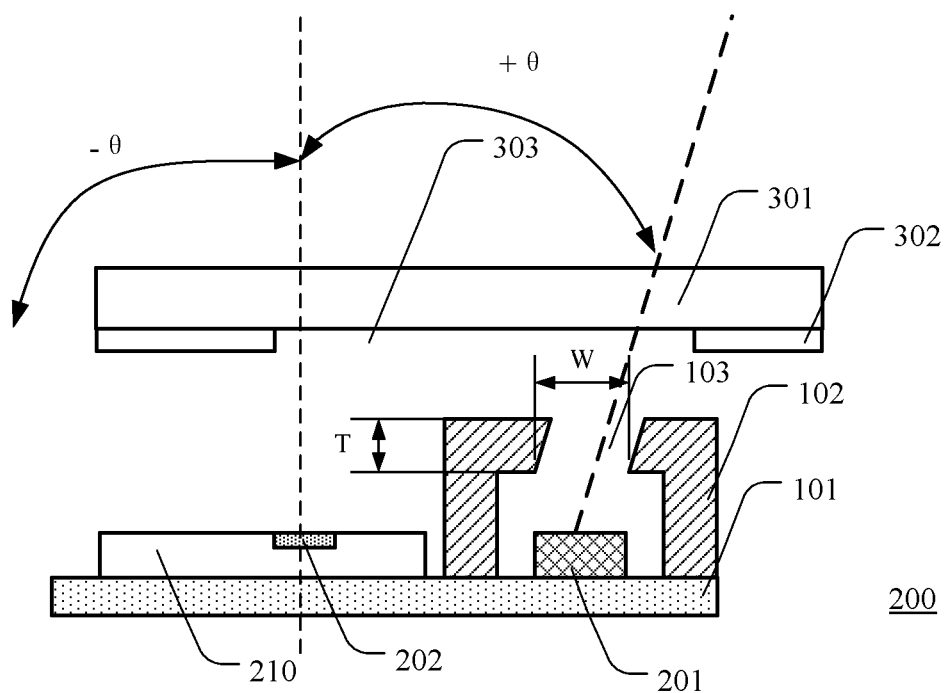
FIG. 3 is a diagram of the direction of light axis of the first example optical detection assembly, in accordance with embodiments of the present invention.

Referring now to FIG. 3, shown is a diagram of the direction of light axis of the first example optical detection assembly, in accordance with embodiments of the present invention. In this particular example, optical detection assembly 200 may utilize an inclined emitting light opening. That is, the central axis of emitting light opening 103 is clockwise reversed relative to a normal direction of a main surface of photoelectric conversion device 202 to form a tilt angle θ. Further, the aperture ratio T/W of emitting light opening 103 is defined as the ratio of nominal depth T to nominal width W. The inclined shape of emitting light opening 103 can constrain the light irradiation direction of light-emitting device 201, thereby a collimating characteristic like a laser diode, and an inclined illumination beam may be formed. The emitted light can be asymmetrically distributed on object 401, and the irradiation position where the light intensity is the largest may correspond to the axis of emitting light opening 103.

In this example, the surface of transparent covering layer 301 can still cause reflection of light between different refractive index media, as indicated by the dashed lines. Housing 102 may be composed of a shading material, such as an opaque resin material. Housing 102 can include a sidewall between light-emitting device 201 and photoelectric conversion device 202. The sidewall may act as a baffle, and the tilt angle between the direction of an emitted light and the normal direction of the main surface of the photoelectric conversion device can make most of the reflected light from surface of transparent covering layer 301 be blocked by the baffle and not reach the photoelectric conversion device. In this way, the optical crosstalk can be reduced, and the signal-to-noise ratio and the accuracy of distance detection may be improved. This example design can allow the height of the baffle to be reduced. That is, the height of housing 102 may be reduced, and thereby the thickness of the entire optical detection assembly can be reduced to facilitate miniaturization of the device. Thus, when optical detection assembly 200 is applied to an electronic device, such as a mobile phone, the size of the electronic device can be further reduced.

In the above-described example, housing 102 of optical detection assembly 200 may form an internal chamber for accommodating light-emitting device 201, in which a separate chamber for accommodating receiving circuit 210 need not be formed. For example, optical detection assembly 200 can further include a transparent encapsulant covering the photoelectric conversion device. This particular design can simplify the structure of housing 102 and increase the light receiving range of photoelectric conversion device 202, and thereby the sensitivity of the optical detection assembly can be improved. In an alternate example, housing 102 of optical detection assembly can include two separate internal chambers for accommodating light-emitting device 201 and receiving circuit 210, respectively. In this case, one sidewall of housing 102 can be located between light-emitting device 201 and receiving circuit 210 as a baffle.

Figure 4A:
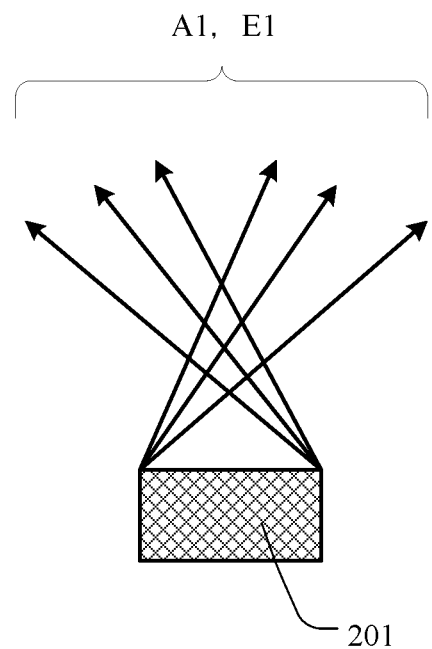
FIGS. 4A-4C are example light irradiation characteristics under different light-emitting constraints, in accordance with embodiments of the present invention.
Figure 4B:
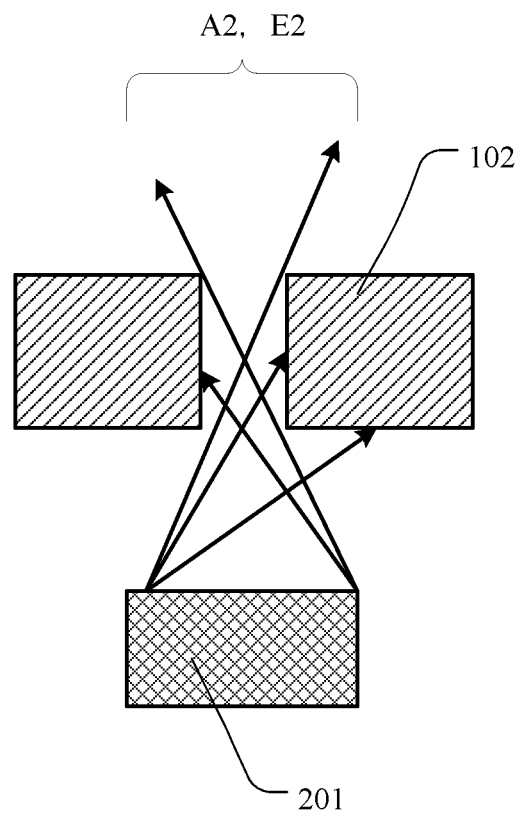
Figure 4C:
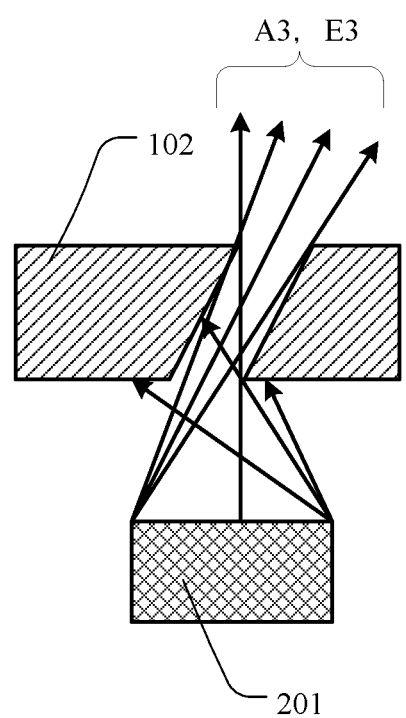

Referring now to FIGS. 4A-4C, shown are example light irradiation characteristics under different light-emitting constraints, in accordance with embodiments of the present invention. As shown in FIG. 4A, when the light emitting path of light-emitting device 201 is not subjected to any restriction, irradiation angle A1 of the light can be relatively large and symmetrically distributed, and light intensity E1 at the irradiation position may be relatively small. As shown in FIG. 4B, when the light emitting path of light-emitting device 201 is constrained by the vertical opening, the range of irradiation angle A2 of the light can be reduced and symmetrically distributed, and light intensity E2 at the irradiation position may be increased. As shown in FIG. 4C, when the light emitting path of light-emitting device 201 is constrained by the inclined opening, the range of irradiation angle A3 of the light may be reduced and asymmetrically distributed, and light intensity E3 at the irradiation position can be increased along the axis of the emitting light opening.

Tables 1 and 2 below show example light irradiation characteristics under different light-emitting constraints. In one example optical detection assembly, the thickness of the covering layer over light-emitting device 201 is about 1.0 mm, and the gap between the covering layer and the top surface of the housing is 0.3 mm. The thickness of top portion of the housing may correspond to the effective depth of the emitting light opening, which is about 0.25 mm or about 0.35 mm. In this example, the shape of the emitting light opening is circular, and the diameter of the circle may correspond to an effective thickness of from about 0.2 to about 0.5 mm. Accordingly, the aperture ratio is, e.g., from about 0.5 to about 1.8. In the examples of Tables 1 and 2, a gray card is used as a reference object, and the electrical signals of the photoelectric conversion device are counted as the crosstalk parameter according to the optical detection assemblies of different light constraints.

Comparing Tables 1 and 2 below, we can see that the crosstalk parameters of the optical detection assembly with inclined emitting light opening are significantly reduced, such as less than 110, as compared with the optical detection assembly with vertical emitting light opening. For an example optical detection assembly using an inclined emitting light opening, the larger the aperture ratio, the smaller the crosstalk parameter. For example, the aperture ratio of the optical detection assembly is increased from 0.7 to 1.8, and the crosstalk parameter is reduced from 102 to 35. The position of the emitting light opening can also be further optimized. For example, when the emitting light opening is further away from the photoelectric conversion device, the crosstalk parameter can be further reduced to 23. In one example optical detection assembly, the aperture ratio of the emitting light opening is in the range of from about 0.3 to about 0.6. In one example optical detecting assembly, the aperture ratio of the emitting light opening can be further increased in order to reduce the crosstalk parameter.

TABLE 1

Relationship between optical constraints and crosstalk of vertical emitting light openings.

| The emitting light opening | | | The covering layer | | Count |
| --- | --- | --- | --- | --- | --- |
| Depth | Radius | T/W | Thickness | Gap | Crosstalk |
| 0.25 | 0.25 | 0.5 | 1.0 | 0.3 | 165 |
| 0.25 | 0.20 | 0.6 | 1.0 | 0.3 | 158 |
| 0.25 | 0.15 | 0.8 | 1.0 | 0.3 | 147 |
| 0.25 | 0.10 | 1.3 | 1.0 | 0.3 | 119 |

TABLE 2

Relationship between optical constraints and crosstalk of inclined emitting light openings.

| The emitting light opening | | | The covering layer | | Count |
| --- | --- | --- | --- | --- | --- |
| Depth | Radius | T/W | Thickness | Gap | Crosstalk |
| 0.35 | 0.25 | 0.7 | 1.0 | 0.3 | 102 |
| 0.35 | 0.20 | 0.9 | 1.0 | 0.3 | 82 |

TABLE 2-continued

Relationship between optical constraints and crosstalk of inclined emitting light openings.

| The emitting light opening | | | The covering layer | | Count |
| --- | --- | --- | --- | --- | --- |
| Depth | Radius | T/W | Thickness | Gap | Crosstalk |
| 0.35 | 0.15 | 1.2 | 1.0 | 0.3 | 71 |
| 0.35 | 0.10 | 1.8 | 1.0 | 0.3 | 35 |
| 0.35 | 0.10 | 1.8 | 1.0 | 0.3 | 23 |

Figure 5A:
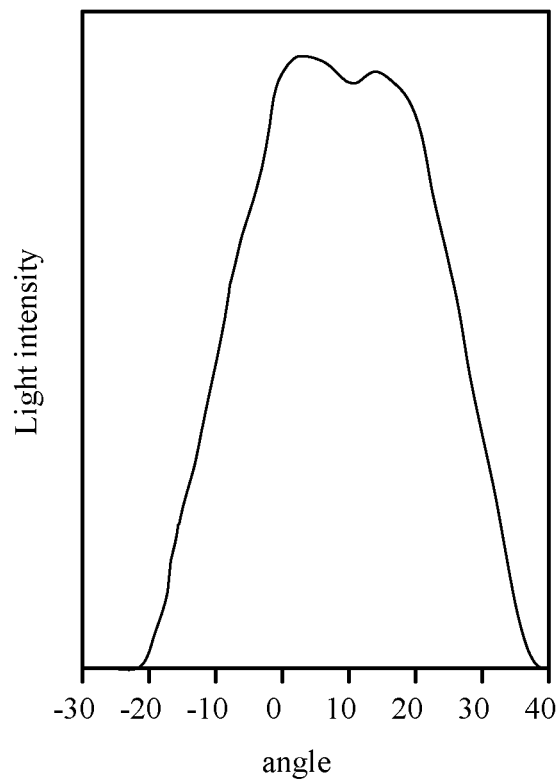
FIGS. 5A-5C are example light intensity distribution curves of the emitting light openings of different apertures, in accordance with embodiments of the present invention.
Figure 5B:
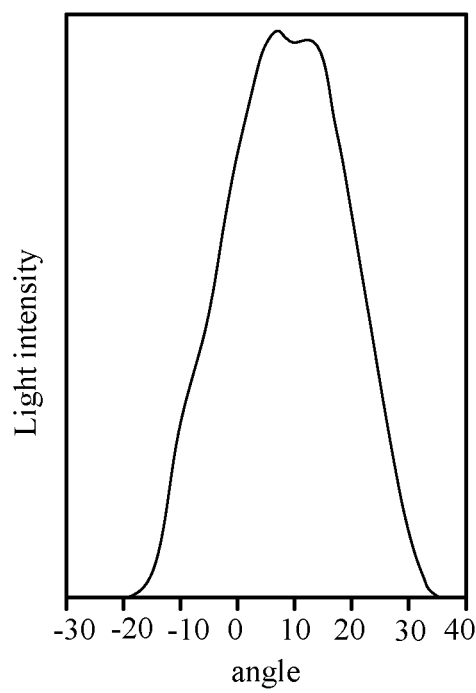
Figure 5C:
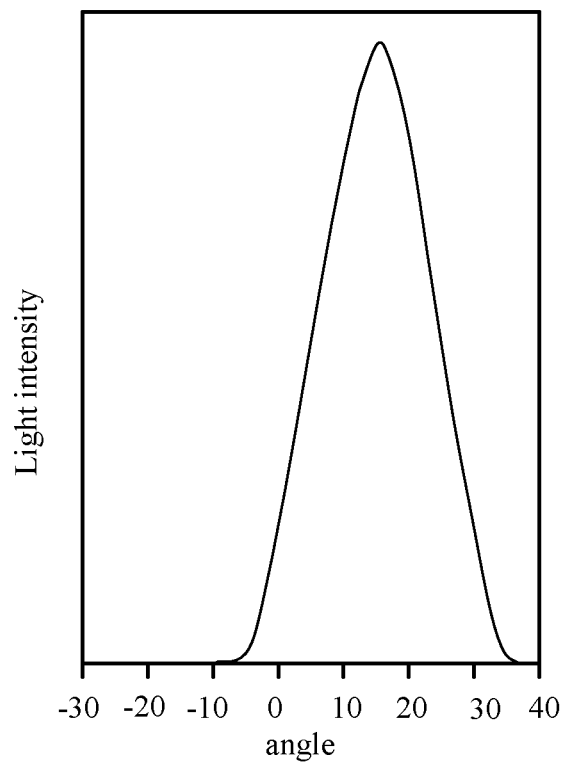

Referring now to FIGS. 5A-5C, shown are example light intensity distribution curves of the emitting light openings of different apertures, in accordance with embodiments of the present invention. In this example, the optical detection assembly employs an inclined emitting light opening, and tilt angle $\theta$ of the central axis of emitting light opening 103 clockwise relative to the normal direction of the main surface of the photoelectric conversion device 202 is 15°. For example, emitting light opening 103 has a depth of about 0.35 mm and a radius of 0.5 mm, 0.3 mm, and 0.2 mm, respectively. Accordingly, the aperture ratio of emitting light opening 103 can, e.g., the 0.35, 0.58, and 0.87, respectively. For the optical detection assembly of the emitting light openings of different aperture ratios, the light intensity distribution curves are respectively measured.

It can be seen that as the aperture ratio of the emitting light opening is increased, the optical detection assembly may not only improve the collimating characteristics of the emitting light opening (e.g., the range of the irradiation angle is reduced), but can also form an asymmetry distribution on the surface of the object. Here, the irradiation position of the highest light intensity corresponds to the axis of the emitting light opening. Also, further increasing tilt angle $\theta$ of emitting light opening 103 can reduce reflected light from the surface of the covering plate, thereby potentially reducing optical crosstalk and increasing the signal-to-noise ratio. However, an increase in a lateral distance between the irradiation position of the object and photoelectric conversion device 202 can occur, thereby decreasing detected light intensity, and reducing the sensitivity of photoelectric conversion device 202. Therefore, tilt angle $\theta$ of emitting light opening 103 can be configured within a suitable range in order to take account of the signal-to-noise ratio and sensitivity. For example, tilt angle $\theta$ of emitting light opening 103 is in the range of from about 2° to about 30°, and the aperture ratio is greater than about 0.8.

Figure 6:
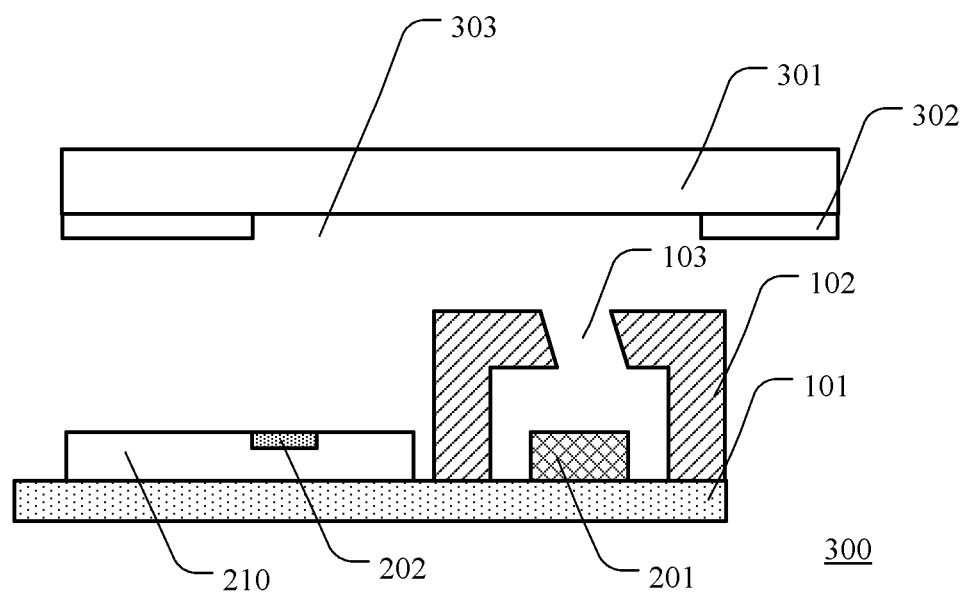
FIG. 6 is a cross-sectional view diagram of a second example optical detection assembly, in accordance with embodiments of the present invention.

Referring now to FIG. 6, shown is a cross-sectional view diagram of a second example optical detection assembly, in accordance with embodiments of the present invention. In this particular example, the optical detection assembly can include a light-emitting device for emitting light as a light source and a photoelectric conversion device for detecting reflected light of the object. For example, the light-emitting device and photoelectric conversion device can be integrated in the same package assembly. For example, optical detection assembly 300 can include substrate 101, housing 102 installed on substrate 101, light-emitting device 201 and receiving circuit 210, transparent covering layer 301 over substrate 101, and barrier layer 302 over substrate 101.

In this example, housing 102 can include a sidewall between light-emitting device 201 and photoelectric conversion device 202. The sidewall may act as a baffle and most of reflected light from the top surface of covering plate may not reach the photoelectric conversion device. This example optical detection assembly 300 may include an inclined emitting light opening. That is, the central axis of emitting light opening 103 is reversed clockwise relative to the normal direction of the main surface of photoelectric conversion device 202 to form a tilt angle θ. In this particular example, the design can further reduce optical crosstalk and improve the accuracy of distance detection, and may allow the height of the baffle to be further reduced. The height of housing 102 can be reduced, thereby the thickness of the entire optical detection assembly can be reduced in order to facilitate miniaturization of the device.

Figure 7:
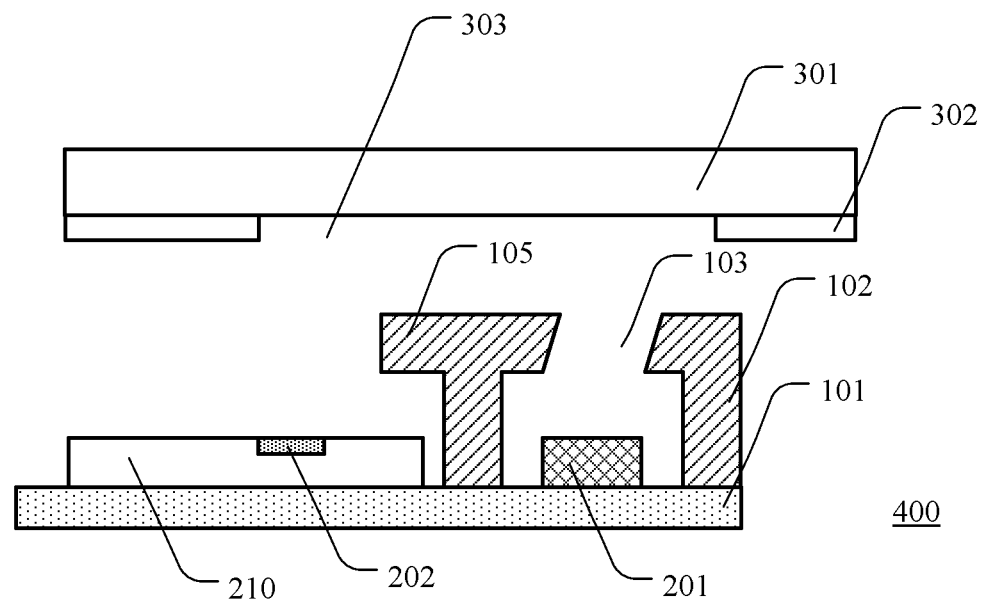
FIG. 7 is a cross-sectional view diagram of a third example optical detection assembly, in accordance with embodiments of the present invention.

Referring now to FIG. 7, shown is a cross-sectional view diagram of a third example optical detection assembly, in accordance with embodiments of the present invention. In this particular example, the optical detection assembly can include a light-emitting device for emitting light as a light source and a photoelectric conversion device for detecting reflected light of the object. For example, the light-emitting device and the photoelectric conversion device may be integrated in the same package assembly. As shown, optical detection assembly 400 can include substrate 101, housing 102 installed on substrate 101, light emitting device 201, receiving circuit 210, and transparent covering layer 301 and barrier layer 302 over substrate 101.

In this example, housing 102 can include a sidewall between light-emitting device 201 and photoelectric conversion device 202, and a protrusion portion (e.g., 105) further extending laterally from the sidewall toward photoelectric conversion device 202. The sidewall and the protrusion portions may together act as a baffle, and most of reflected light from the surface of covering plate may not reach the photoelectric conversion device. In this particular example, the optical detection assembly can further reduce optical crosstalk and improve the accuracy of distance detection. This example design can allow the height of the baffle to be further reduced. That is, the height of housing 102 can be reduced, thereby reducing the thickness of the entire optical detecting assembly in order to facilitate miniaturization of the device.

Figure 8:
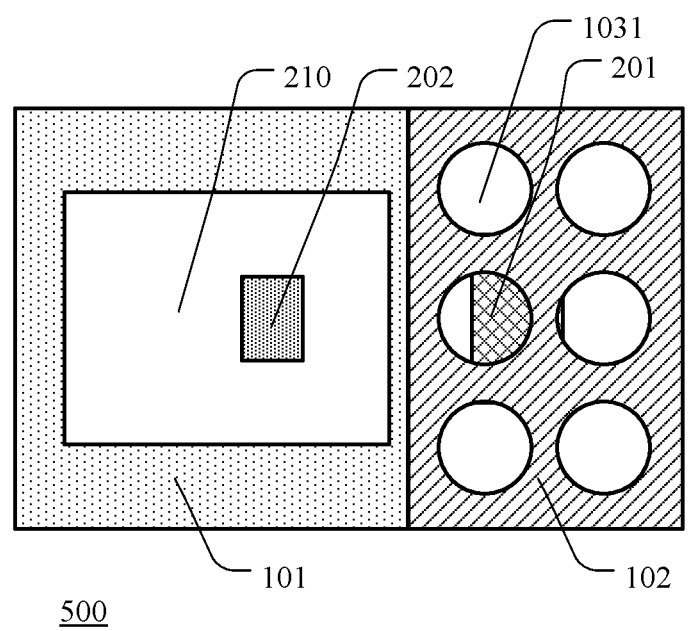
FIG. 8 is a top view diagram of a fourth example optical detection assembly, in accordance with embodiments of the present invention.

Referring now to FIG. 8, shown is a top view diagram of a fourth example optical detection assembly, in accordance with embodiments of the present invention. In this particular example, the optical detection assembly can include a light-emitting device for emitting light as a light source and a photoelectric conversion device for detecting reflected light of the object. For example, the light-emitting device and the photoelectric conversion device can be integrated in the same package assembly. As shown, optical detection assembly 500 can include substrate 101, housing 102 installed on substrate 101, light-emitting device 201 and receiving circuit 210, and transparent covering layer 301 and barrier layer 302 over substrate 101. In this example, housing 102 can include a sidewall between light-emitting device 201 and photoelectric conversion device 202. The sidewall may act as a baffle and most of the reflected light from the surface of covering plate may not reach the photoelectric conversion device. Housing 102 can include a plurality of circular-shaped emitting light openings 1031, and light-emitting device 201 may be located below at least a portion of emitting light openings 1031.

In this particular example, the optical detection can include a plurality of emitting light openings 1031. In this design, a plurality of irradiation beams can be generated by one light-emitting device 201, and photoelectric conversion device 202 can detect any one of the reflected beams, thereby improving the sensitivity of detection. Further, the size of light-emitting device 201 may be larger than the size of emitting light opening 1031, such that different size light-emitting devices 201 can be matched with the same housing 102. In this way, the same housing can be applied to different specifications of the light-emitting device in order to improve suitability of housing 102.

Figure 9:
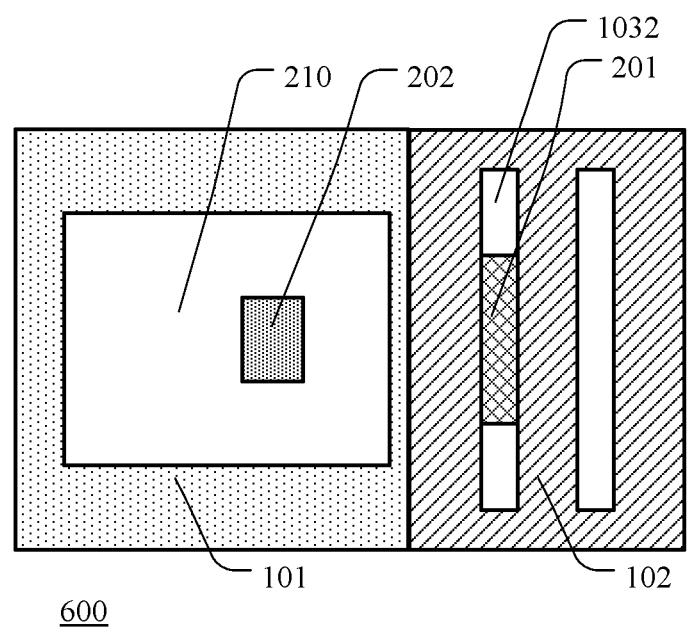
FIG. 9 is a top view diagram of a fifth example optical detection assembly, in accordance with embodiments of the present invention.

Referring now to FIG. 9, shown is a top view diagram of a fifth example optical detection assembly, in accordance with embodiments of the present invention. In this particular example, the optical detection assembly can include a light-emitting device for emitting light as a light source and a photoelectric conversion device for detecting reflected light of the object. For example, the light-emitting device and the photoelectric conversion device may be integrated in the same package assembly. As shown, optical detection assembly 600 can include substrate 101, housing 102 installed on substrate 101, light-emitting device 201 and receiving circuit 210, and transparent covering layer 301 and barrier layer 302 over substrate 101. In this example, housing 102 can include a sidewall between light-emitting device 201 and photoelectric conversion device 202. The sidewall can act as a baffle and most of the reflected light from the surface of covering plate may not reach the photoelectric conversion device. Housing 102 can include a plurality of rectangular-shaped emitting light openings 1032, and light-emitting device 201 may be located below at least a portion of emitting light openings 1032.

In this example, the optical detection assembly can include a plurality of emitting light openings 1032. In this example, a plurality of irradiation beams can be generated by one light-emitting device 201, and photoelectric conversion device 202 can detect any one of the reflected beams, thereby improving the sensitivity of detection. Further, the size of light-emitting device 201 can be larger than the size of emitting light opening 1032, such that different size light-emitting devices 201 can be matched with the same housing 102. In this way, the same housing can be applied to different specifications of the light-emitting device in order to improve suitability of housing 102.

Figure 10:
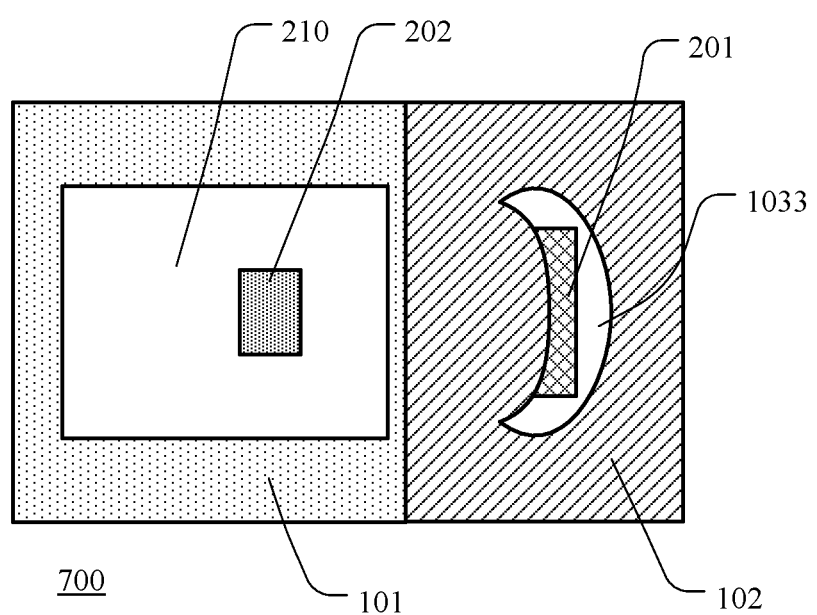
FIG. 10 is a top view diagram of a sixth example optical detection assembly, in accordance with embodiments of the present invention.

Referring now to FIG. 10, shown is a top view diagram of a sixth example optical detection assembly, in accordance with embodiments of the present invention. In this particular example, the optical detection assembly can include a light-emitting device for emitting light as a light source and a photoelectric detection device for detecting reflected light of the object. For example, the light-emitting device and the photoelectric conversion device may be integrated in the same package assembly. As shown, optical detection assembly 700 can include substrate 101, housing 102 installed on substrate 101, light-emitting device 201, receiving circuit 210, and transparent covering layer 301 and barrier layer 302 over substrate 101.

In this example, housing 102 can include a sidewall between light-emitting device 201 and photoelectric conversion device 202. The sidewall may act as a baffle and most of the reflected light from the surface of covering plate may not reach the photoelectric conversion device. This example optical detection assembly can include a crescent-shaped emitting light opening 1033. In this example, the optical detection assembly can reduce optical crosstalk and improve the accuracy of distance detection. This design may allow the height of the baffle to be reduced. That is, the height of housing 102 can be reduced, thereby reducing the thickness of the entire optical detection assembly in order to facilitate miniaturization of the device.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An optical detection assembly, comprising:
   a) a light-emitting device and a photoelectric conversion device installed in parallel on a substrate, wherein light generated by said light-emitting device is irradiated onto an object, and said photoelectric conversion device is configured to convert a reflected light of said object into an electrical signal; and
   b) a housing formed by light shielding material installed on said substrate, wherein said housing comprises a first chamber for accommodating said light-emitting device, a sidewall that separates said light-emitting device and said photoelectric conversion device, and at least one emitting light opening at the top of said first chamber and having an axis inclined at a tilt angle, wherein said housing comprises a first protrusion portion extending laterally from said sidewall toward said light-emitting device, wherein said opening at the top of said first chamber is formed by two tilted edges that are parallel to each other at said tilt angle and are not perpendicular to said light-emitting device.

2. The optical detection assembly of claim 1, wherein said axis of said at least one emitting light opening is reversed clockwise or counterclockwise to form said tilt angle relative to a normal direction of a major surface of said photoelectric conversion device.

3. The optical detection assembly of claim 2, wherein said axis of said at least one light-emitting opening is away from said normal direction of said major surface of said photoelectric conversion device.

4. The optical detection assembly of claim 1, wherein said tilt angle is in a range of from 2° to 30°.

5. The optical detection assembly of claim 1, wherein an aperture ratio of said at least one emitting light opening is greater than 0.8, and said aperture ratio is a ratio of a depth of said emitting light opening to a width of said emitting light opening.

6. The optical detection assembly of claim 1, wherein a cross-sectional shape of said at least one emitting light opening is selected from: a rectangle, a circle, an ellipse, a racetrack, and a crescent.

7. The optical detection assembly of claim 1, wherein at least a portion of said light-emitting device is located below said at least one emitting light opening.

8. The optical detection assembly of claim 1, wherein said housing further comprises a protrusion portion extending laterally from said sidewall toward said photoelectric conversion device, and said sidewall and said protrusion portion are used as baffles together.

9. The optical detection assembly of claim 1, further comprising a transparent encapsulant covering said photoelectric conversion device.

10. The optical detection assembly of claim 1, wherein said housing further comprises a second chamber for accommodating said photoelectric conversion device, and at least one receiving light opening at a top of said second chamber.

11. The optical detection assembly of claim 1, further comprising a covering plate above said substrate, wherein said covering plate comprises a transparent covering layer and a shielding layer, and said shielding layer is configured to block a portion of said covering layer to form an opening through which light passes.

12. The optical detection assembly of claim 11, wherein a gap between said covering plate and a top surface of said housing is less than 1 mm.

13. The optical detection assembly of claim 1, wherein a distance between said light-emitting device and said photoelectric conversion device is at least 1 mm.

14. The optical detection assembly of claim 1, wherein said first protrusion portion partially covers said light-emitting device.

15. The optical detection assembly of claim 14, wherein said first protrusion portion extends over said light-emitting device due to said tilt angle.

* * * * *